United States Patent [19]

Morizumi

[11] Patent Number: 5,394,212
[45] Date of Patent: Feb. 28, 1995

[54] DIAPHRAGM WITH LIGHT BLOCKING ELEMENT

[75] Inventor: Masaaki Morizumi, Tokyo, Japan

[73] Assignee: Fuji Photo Optical Co., Ltd., Omiya, Japan

[21] Appl. No.: 95,443

[22] Filed: Jul. 23, 1993

[30] Foreign Application Priority Data

Jul. 23, 1992 [JP] Japan .................. 4-196989

[51] Int. Cl.⁶ .................................. G03B 9/06
[52] U.S. Cl. .................... 354/271.1; 354/274
[58] Field of Search .............. 354/270, 271.1, 274; 359/888

[56] References Cited

U.S. PATENT DOCUMENTS

| | | | |
|---|---|---|---|
| 3,668,995 | 6/1972 | Bardutzky | 354/274 |
| 3,727,531 | 4/1973 | Baab | 354/274 |
| 4,975,725 | 12/1990 | Morisawa | 354/271.1 X |
| 5,225,936 | 7/1993 | Sugiura et al. | 359/888 X |
| 5,250,971 | 10/1993 | Okura | 354/274 |

FOREIGN PATENT DOCUMENTS 52-117127 10/1977 Japan .

Primary Examiner—Howard B. Blankenship
Assistant Examiner—J. K. Han
Attorney, Agent, or Firm—Keck, Mahin & Cate

[57] ABSTRACT

An aperture diaphragm, configured by a plurality of diaphragm blades which are formed with generally wedge-shaped notches for defining small diaphragm apertures, is provided with a supplemental diaphragm blade coupled to one of the diaphragm blades. The supplemental diaphragm blade has a supplemental notch which is similar in shape to but shallower than the generally wedge-shaped notch of the one of the diaphragm blades so as to block up the smallest diaphragm aperture defined by the generally wedge-shaped notches of the diaphragm blades.

6 Claims, 2 Drawing Sheets

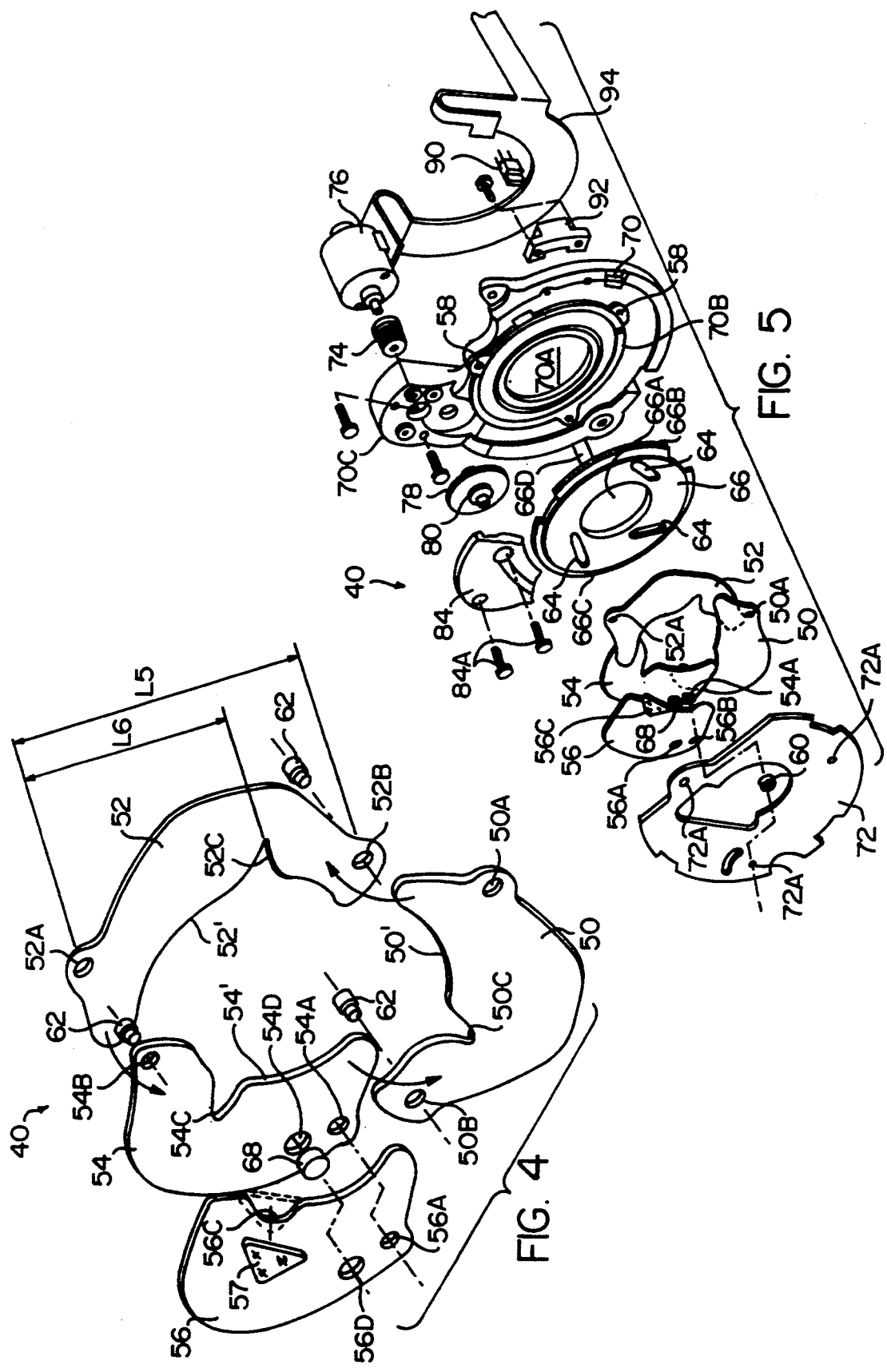

DIAPHRAGM WITH LIGHT BLOCKING ELEMENT

BACKGROUND OF THE INVENTION

1. Field of the Invention

This invention relates to a diaphragm, and, more particularly, to an iris diaphragm for use with optical instruments, such as still cameras and video cameras, for controlling the amount of light.

2. Description of Related Art

Iris diaphragms for use with optical instruments, such as still cameras and video cameras, are often automatically controlled to regulate the amount of light. These diaphragms are divided into two types.

The first type of iris diaphragm has a plurality of sector-shaped diaphragm blades, to one of which a neutral density filter is secured. Although this type of iris diaphragm is adapted to close entirely, its aperture is prevented from excessively decreasing in size when it is automatically controlled. On the other hand, while the camera is not in use, the iris diaphragm is entirely closed to isolate internal elements of the camera from light.

Referring to FIG. 1, showing one of the conventional first type of iris diaphragms, sector-shaped diaphragm blades 10, 12 and 14 are partially lapped one over another so as to form a substantially circular opening, as a diaphragm aperture DP, with their inside edges. The blades are held between a stationary diaphragm ring (not shown) and a diaphragm adjusting ring 24 which are arranged coaxially and are enabled to make relative rotation. These diaphragm blades 10, 12 and 14 are, respectively, pivoted on pivot pins 10A, 12A and 14A secured to the stationary diaphragm ring. Each of the diaphragm blades 10, 12 and 14 is formed with a cam slot 10B, 12B or 14B, adjacent to its pivot pin 10A, 12A or 14A, which is directed approximately radially when the diaphragm blades 10, 12 and 14 are fully opened. The diaphragm adjusting ring 24 is provided with actuator pins 16, 18 and 20 at regular angular separations which are, respectively, received for sliding movement within the cam slots 10B, 12B and 14B of diaphragm blades 10, 12 and 14. Turning of diaphragm adjusting ring 24 causes the diaphragm blades 10, 12 and 14 to turn about pivot pins 10A, 12A or 14A to open and close the iris diaphragm. Diaphragm blade 10, which at the top, as viewed from the stationary diaphragm ring, is provided, at the middle of the inside edge, with a small piece of neutral density filter 22 adhered thereto so as to project within the opening defined by the diaphragm blades 10, 12 and 13.

Turning of the diaphragm adjusting ring 24 in the counterclockwise direction causes diaphragm blades 10, 12 and 14 to turn about pivot pins 10A, 12A and 14A, respectively, in the same direction so as to diminish the diaphragm aperture DP and finally close it entirely. On the other hand, when turning the diaphragm adjusting ring 24 in the clockwise direction, the diaphragm blades 10, 12 and 14 are forced to turn about pivot pins 10A, 12A and 14A, respectively so as to gradually open the diaphragm aperture DP.

If this iris diaphragm is automatically controlled responding to changes in the amount of light, because a distance L1 of a point of action from the pivot pin of diaphragm blade 10, 12, 14 is shorter than a distance L2 of a center of the blade from the pivot pin of diaphragm blade 10, 12, 14, operational plays between the actuator pins 16, 18 and 20 and the cam slots 10B, 12B and 14B of diaphragm blades 10, 12 and 14, respectively, are magnified. Accordingly, the iris diaphragm exhibits a diaphragm aperture of less accuracy. If high accuracy is a requirement, then a feedback control, which in turn will generally slow down a control of the aperture diaphragm, is necessary.

Referring to FIG. 2 showing another type of conventional iris diaphragm, a plurality of circular arcuate-shaped elongated diaphragm blades 30 are lapped one over another so as to form a substantially circular opening, as a diaphragm aperture, with their inside edges and held between stationary diaphragm rings 31. A diaphragm adjusting ring 32 with an adjusting projection 34 is arranged coaxially with and supported for rotation between the stationary diaphragm rings 31. These diaphragm blades 30 are, respectively, each pivoted at one end on pivot pins 30A secured to the stationary diaphragm ring 31 at regular angular intervals. Each of the diaphragm blades 30 is provided at the other end with a pin 30B. The diaphragm adjusting ring 32 is provided with actuator slots 32A at regular angular intervals. The pins 30B of diaphragm blades 30 are, respectively, received in the actuator slots 32A of diaphragm adjusting ring 32.

Turning of the diaphragm adjusting ring 32 in the counterclockwise direction causes diaphragm blades 30 to turn about pivot pins 30A in the same direction so as to open the diaphragm aperture DP. On the other hand, when turning the diaphragm adjusting ring 32 in the clockwise direction, the diaphragm blades 30 are forced to turn about pivot pins 30A so as to diminish the diaphragm aperture DP.

This type of iris diaphragm offers a decrease of operational play caused at a point of action, namely, between the actuator slot 32A and pin 30B, of the diaphragm blade 30. This is because a distance L3 between points of action of the pivot pin of a diaphragm blade 30 is longer than a distance L4 between center of blade 30 and the pivot pin 30A of a diaphragm blade 30. Consequently, the iris diaphragm offers an increase in accuracy of diaphragm aperture.

However, when the iris diaphragm is adjusted to smaller sizes of apertures, the diaphragm blades 30 interfere with one another, so as to render the iris diaphragm difficult to fully close as shown in FIG. 3. Further, it is difficult to attach a neutral density filter to one of the diaphragm blades 30.

SUMMARY OF THE INVENTION

It is a primary object of the present invention to provide an aperture diaphragm which forms the diaphragm aperture with a high accuracy and operates at a high speed, enabling automization of the aperture diaphragm without a sacrifice of accuracy.

It is another object of the present invention to provide an aperture diaphragm which enables the utilization of a neutral density filter.

The foregoing objects of the present invention are accomplished by providing an aperture diaphragm which is configured by a plurality of diaphragm blades, which have substantially circular arcuate inner edges with which a variable diaphragm aperture is defined and are formed with generally wedge-shaped notches, extending from said substantially circular arcuate inner edges, respectively, with which a small variable diaphragm aperture is defined. The diaphragm blades are, on one hand, pivotally supported at their one ends by a stationary support means, such as a stationary diaphragm ring, at regular angular separations. On the other hand, they are engaged for slide movement by a diaphragm adjusting means, such as a diaphragm adjusting ring, which in turn is supported for relative rotation by the stationary support means. A relative rotation caused between the stationary and adjusting ring causes pivotal movement of the diaphragm blades to vary a diaphragm aperture from a full diaphragm aperture to a smallest diaphragm aperture. The aperture diaphragm has a supplemental diaphragm blade, mechanically coupled to one of the diaphragm blades, which has a supplemental notch similar in shape to but shallower than the generally wedge-shaped notch of the one diaphragm blade. This supplemental diaphragm blade blocks up the smallest diaphragm aperture defined by the generally wedge-shaped notches of the diaphragm blades.

The aperture diaphragm further includes a filter, such as a neutral density filter, superposed over the supplemental notch of the supplemental diaphragm blade so as to overlay diminuent diaphragm apertures defined by the generally wedge-shaped notches, thereby reducing the amount of light passing through the aperture diaphragm.

BRIEF DESCRIPTION OF THE DRAWINGS

The above and other objects and features of the present invention will be clearly understood from the following detailed description with respect to preferred embodiments thereof when considered in conjunction with the accompanying drawings, in which:

FIG. 4 is an exploded perspective view of an aperture diaphragm in accordance with a preferred embodiment of the present invention; and FIG. 5 is an enlarged view of diaphragm blades of the aperture diaphragm of FIG. 4.

DETAILED DESCRIPTION OF THE PREFERRED EMBODIMENT

Figure 1:
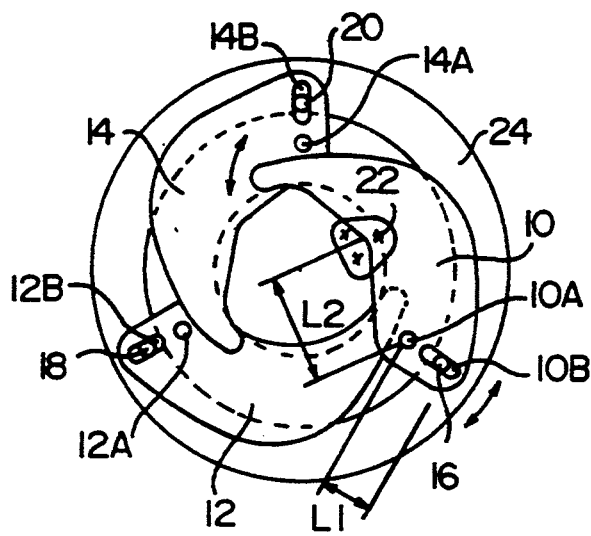
FIG. 1 is a plan view of one type of conventional iris aperture diaphragm.
Figure 2:
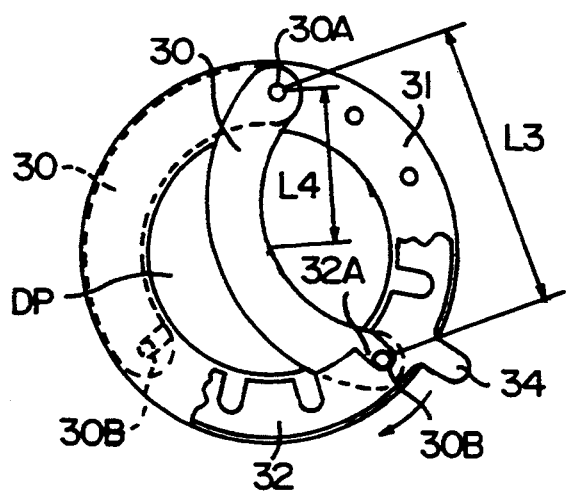
FIG. 2 is a plan view of another type of conventional iris aperture diaphragm.
Figure 3:
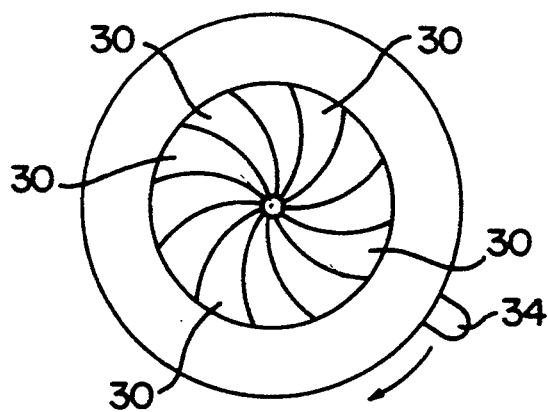
FIG. 3 is a plan view of the conventional iris aperture diaphragm of FIG. 2 in which a smallest aperture is formed.

Referring to FIGS. 4 and 5, an aperture diaphragm, for instance a motor driven iris aperture diaphragm 40, in accordance with a preferred embodiment of the invention is shown. This aperture diaphragm 40 includes a stationary diaphragm ring 70 and a diaphragm adjusting ring 66 supported for rotation by the stationary diaphragm ring 70. That is, stationary diaphragm ring 70 is formed with a circular arcuate slot 70B extending concentrically with the hole 70A and, on the other hand, the diaphragm adjusting ring 66 is formed with a rearward extending rim 66B, covering part of periphery of the diaphragm adjusting ring 66 and involving one cam slot 64, which is received for sliding within the circular arcuate groove 70B of the stationary diaphragm ring 70 so as to allow the diaphragm adjusting ring 66 to rotate around the groove 70B of the stationary diaphragm ring 70. The diaphragm adjusting ring 66 is formed with peripheral teeth 66C on part of periphery of the diaphragm adjusting ring 66 and involving two cam slots 64, which engage with a gear mechanism described later. These diaphragm rings 70 and 66 define concentric holes 70A and 66A, respectively, therein for forming a diaphragm aperture DP. The aperture diaphragm 40 has first to third and supplemental diaphragm blades 50, 52, 54 and 56 which are pivoted for swing movement so as to variably define the diaphragm aperture DP thereby. These first to third diaphragm blades 50, 52 and 54 are covered by means of a front panel 72 attached to the stationary diaphragm ring 70 through engagement between pivot pins 58 secured to the stationary diaphragm ring 70 and fixedly received in holes 72A formed with the front panel 72.

First to third diaphragm blades 50, 52 and 54, which are generally crescent-shaped, are formed at their one ends with holes 50A, 52A and 54A, respectively, into which pivot pins 58, secured to stationary diaphragm ring 70 at regular angular separations, are fitted from the back, respectively, so that the diaphragm blades 50, 52 and 54 turn about the pivot pins 58, thereby variably defining the diaphragm aperture DP. The first to third diaphragm blades 50, 52 and 54 are further formed at their other ends with holes 50B, 52B and 54B, respectively, to which cam follower pins 62 are secured from the back, respectively. The respective cam follower pins 62 are received and slide in cam slots 64 formed in the diaphragm adjusting ring 66 at regular angular separations, which will be described later. Each of the cam slots 64 is designed and adapted to be straight and inclined at an angle with respect to a radial direction of the diaphragm adjusting ring 66. Diaphragm blades 50, 52, 54 are formed with wedge-shaped principals or indents 50C, 52C, 54C, respectively, at the mid-ways of their inner edges 50', 52' and 54'. These wedge-shaped diminutive principals 50C, 52C, 54C are provided to define diminutive diaphragm apertures and are formed identically in shape and relatively deep. As clearly seen in FIG. 4, only third diaphragm blade 54 is formed with a hole 54D near hole 54A into which pivot pin 58 is fitted.

First to third diaphragm blades 50, 52 and 54 lie to partially lap one another so as to form a generally circularly-shaped diaphragm aperture DP defined by their inner edges 50', 52' and 54'. Specifically, one end portion of second diaphragm blade 52, remote from the other end portion where pivot pin 58 pivots second diaphragm blade 52 thereon, is lapped over the other end portion of first diaphragm blade 50 where pivot pin 58 pivots first diaphragm blade 50 thereon. Similarly, one end portion of first diaphragm blade 50, remote from the other end portion where pivot pin 58 pivots first diaphragm blade 50 thereon, is lapped over the other end portion of third diaphragm blade 54 where pivot pin 58 pivots blade 54 thereon, and one end portion of third diaphragm blade 54, remote from the other end portion where pivot pin 58 pivots third diaphragm blade 54 thereon, is lapped over the other end portion of second diaphragm blade 52 where pivot pin 58 pivots blade 52 thereon.

Supplemental diaphragm blade 56 is formed at its one end with a hole 56A, into which pivot pin 58, passing through the third diaphragm blade 54, is fitted from the back so as to pivot the supplemental diaphragm blade 56 coaxially with the third diaphragm blade 54. The supplemental diaphragm blade 56 is further formed with notch 56C near which connection pin 68, fixedly fitted into hole 54D of the third diaphragm blade 54, is received in hole 56D. The supplemental diaphragm blade 56 is approximately completely overlapped on the third diaphragm blade 54 with a space, defined therebetween by the connection pin 68, into which the first diaphragm blade 50 is placed. Accordingly, supplemental diaphragm blade 56 turns about pivot pin 58 together with third diaphragm blade 54.

Supplemental diaphragm blade 56 is formed with a generally trapezoidal supplemental notch or indent 56C at the mid-way of its inner edge 56', which is shaped to include part of the wedge-shaped diminutive principal 54C and be shallower than the diminutive principals 50C, 52C and 54C of first to third diaphragm blades 50–54 and is provided with a neutral density (ND) filter 57 which is shaped so as to cover the supplemental notch 56C and form part of the inner edge 56' of the supplemental diaphragm blade 56. Consequently, when supplemental diaphragm blade 56 overlaps third diaphragm blade 54, the diminutive principal 54C of the third diaphragm blade 54 is partly hidden by the supplemental diaphragm blade 56 and partly covered by the ND filter 57.

Stationary diaphragm ring 70 has a projection 70C to which a reversible electric motor 76 with an output gear 74 is attached from the back. The output gear 74 of reversible electric motor 76 passes through an opening in projection 70C and meshes with a gear 78 integrally and coaxially formed with a small gear 80 supported for rotation between and by the projection 70C and a front cover 84 fastened by set screws 84A. The gear 78 is in mesh with the output gear 74 of reversible electric motor 76 and, on the other hand, the gear 80 is in mesh with the peripheral teeth 66C of diaphragm adjusting ring 66. The reversible electric motor 76 is connected to a control means including a power source (not shown) by means of a flexible printed circuit base 94. Further, stationary diaphragm ring 70 is provided with a home position sensor 90, attached thereto by means of a mount block 92, which detects a positioning claw 66D extending rearward from the rim 66B of diaphragm adjusting ring 66, passing through the circular arcuate slot 70B of stationary diaphragm ring 70.

In operation of the motor driven automatic iris aperture diaphragm 40 depicted in FIGS. 4 and 5 and described above, when actuating the motor 76 in one direction or diaphragm aperture reducing direction, the diaphragm adjusting ring 66 is turned in the clockwise direction as the aperture diaphragm 40 is seen from the front. Consequently, the diaphragm adjusting ring 66 forces the diaphragm blades 50, 52, 54 and 56 to turn in the clockwise direction about their pivot pins 58 by means of the engagement between the cam slots 64 and cam follower pins 62, so as to gradually decrease the diaphragm aperture DP defined by their inner edges 50', 52', 54' and 56'. In this instance, since each cam slot 64 is straight, a turned angle of each diaphragm blade 50, 52, 54 is linearly proportional to an angle through which the diaphragm adjusting ring 66 is turned. Further, since each diaphragm blade 50, 52, 54 is pivoted at one end on pivot pin 58 and is guided at the other end by means of the engagement between the cam follower pin 62 and cam slot 64, it turns with less play and provides a straight distance $L_6$ to the diminutive principal from the pivot point less than a straight distance $L_5$ to the guide point from the pivot point, so that, even if there is a play between cam slot 64 and cam follower pin 62, any varied diaphragm aperture DP is defined with a high accuracy. This leads to eliminating a feedback mechanism.

When first to third diaphragm blades 50, 52 and 54 define diminutive diaphragm apertures with their diminutive principals 50C, 52C and 54C, the ND filter 57 covering the supplemental notch 56C of the supplemental diaphragm blade 56 covers the diaphragm aperture DP to decline the amount of light passing through the diaphragm. This enables the diaphragm to prevent itself from causing an over decrease in aperture size if it provides an automatic aperture control. Further, when first to third diaphragm blades 50, 52 and 54 close to a smallest diaphragm aperture, which are defined with bottom portions of their diminutive principals 50C, 52C and 54C, then, the supplemental diaphragm blade 56 hides the diaphragm aperture completely.

On the other hand, when actuating the motor 76 in the other or reverse direction, the diaphragm adjusting ring 66 is turned counterclockwise so as to force the first to third diaphragm blades 50, 52 and 54 in the counterclockwise direction about the pivot pins 58, thereby gradually increasing the aperture size to its full aperture size.

It is also to be understood that although the present invention has been described in detail with respect to a preferred embodiment thereof, various other embodiments and variants may occur to those skilled in the art. Such other embodiments and variants fall within the scope and spirit of the invention and are intended to be covered by the following claims.

What is claimed is:

1. In an iris diaphragm configured by a plurality of diaphragm blades, partially overlapped, having substantially circular arcuate inner edges with which a variable diaphragm aperture is defined and formed with generally wedge-shaped notches, extending from said substantially circular arcuate inner edges, respectively, with which a variable diaphragm aperture is defined, a stationary support ring for pivotally supporting said diaphragm blades, at first ends of said diaphragm blades, at regular angular separations, and a diaphragm adjusting ring, rotatable relative to said stationary support ring and engaged for sliding movement with each of said diaphragm blades at second ends of said diaphragm blades remote from said first ends, said sliding movement causing pivotal movement of said diaphragm blades to vary said diaphragm aperture from a full diaphragm aperture to a smallest diaphragm aperture with an increase in relative rotation between said stationary support ring and said diaphragm adjusting ring, each of said notches being located between one of said first ends and one of said second ends, the improvement comprising:

a supplemental diaphragm blade coupled to any one of said diaphragm blades, said supplemental diaphragm blade having a supplemental notch which is similar in shape to but shallower than the generally wedge-shaped notch of said one of said diaphragm blades so as to block up and close off said smallest diaphragm aperture defined by said generally wedge-shaped notches of said diaphragm blades.

2. An improvement as defined in claim 1, wherein said supplemental diaphragm blade is provided with a filter superposed over said supplemental notch so as to overlay diminuent diaphragm apertures defined by said generally wedge-shaped notches, thereby reducing the amount of light passing through the iris diaphragm.

3. An improvement as defined in claim 2, wherein said filter comprises a neutral density filter.

4. An improvement as defined in claim 1, wherein said supplemental diaphragm blade is placed in a space formed between adjacent ones of said diaphragm blades.

5. An improvement as defined in claim 1, wherein said stationary support ring is provided with pivot pins secured thereto at regular angular separations, on which said diaphragm blades are pivotally mounted, and said diaphragm adjusting ring is supported for rotation by and coaxial with said stationary support ring, said diaphragm adjusting ring being formed with cam slots at regular angular separations, each of which receives a cam follower pin secured to one of the second ends of said diaphragm blades.

6. An improvement as defined in claim 5, and further comprising a reversible electric motor operationally coupled to said diaphragm adjusting ring.

* * * * *